US010911131B1

(12) United States Patent
Desai et al.

(10) Patent No.: US 10,911,131 B1
(45) Date of Patent: Feb. 2, 2021

(54) HYBRID RELAY FOR HIGH DENSITY VENUES

(71) Applicant: Cisco Technology, Inc., San Jose, CA (US)

(72) Inventors: Vishal Satyendra Desai, San Jose, CA (US); Jerome Henry, Pittsboro, NC (US); Indermeet Singh Gandhi, Bangalore (IN); Robert E. Barton, Richmond (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/568,721

(22) Filed: Sep. 12, 2019

(51) Int. Cl.
| | | |
|---|---|---|
| *G01S 5/02* | (2010.01) | |
| *G01S 5/14* | (2006.01) | |
| *H04W 64/00* | (2009.01) | |
| *H04B 7/155* | (2006.01) | |
| *H04W 52/46* | (2009.01) | |
| *H04W 40/12* | (2009.01) | |
| *H04W 88/10* | (2009.01) | |

(52) U.S. Cl.
CPC ........ *H04B 7/15557* (2013.01); *H04W 40/12* (2013.01); *H04W 52/46* (2013.01); *H04W 64/006* (2013.01); *H04W 88/10* (2013.01)

(58) Field of Classification Search
CPC ........ G01S 5/0252; G01S 5/14; H04W 4/029; H04W 64/006
USPC ........ 455/7, 11.1, 405, 127.1; 370/315, 311, 370/328, 236; 348/152
See application file for complete search history.

(56) References Cited

U.S. PATENT DOCUMENTS

| | | | |
|---|---|---|---|
| 9,204,335 B2 | 12/2015 | Segev et al. | |
| 2006/0215576 A1 | 9/2006 | Yu et al. | |
| 2008/0111884 A1* | 5/2008 | Cloutier | H04Q 9/00 348/152 |
| 2008/0162921 A1* | 7/2008 | Chesnutt | H04W 12/12 713/2 |
| 2010/0109863 A1* | 5/2010 | Russell | G08B 25/009 340/539.11 |
| 2012/0170514 A1* | 7/2012 | Lo | H04W 52/262 370/328 |

(Continued)

FOREIGN PATENT DOCUMENTS

JP 2008277919 A 11/2008

OTHER PUBLICATIONS

International Search Report and Written Opinion issued in PCT/US2020/049348, dated Oct. 28, 2020.

(Continued)

*Primary Examiner* — Tan H Trinh
(74) *Attorney, Agent, or Firm* — Merchant & Gould P.C.

(57) ABSTRACT

A hybrid relay for high density venues may be provided. First, a user density value at an Access Point (AP) disposed above a ground level may be determined. Then a user density value at an AP-relay disposed at the ground level may be determined. Next, it may be determined that a difference between the user density value at the AP and the user density value at the AP-relay is greater than a predetermined threshold. The AP-relay may then be switched from a sensor mode to an AP-relay mode in response to determining that the difference between the user density value at the AP and the user density value at the AP-relay is greater than the predetermined threshold.

20 Claims, 6 Drawing Sheets

(56) References Cited

U.S. PATENT DOCUMENTS

| | | | |
|---|---|---|---|
| 2014/0370830 A1* | 12/2014 | Steer | H04W 52/18 |
| | | | 455/127.1 |
| 2015/0081532 A1 | 3/2015 | Lewis et al. | |
| 2015/0304978 A1* | 10/2015 | Bhanage | H04W 40/244 |
| | | | 370/236 |
| 2015/0326624 A1* | 11/2015 | Rajendran | H04L 61/609 |
| | | | 709/204 |
| 2015/0341502 A1* | 11/2015 | Udeshi | H04W 16/18 |
| | | | 455/405 |
| 2015/0372919 A1* | 12/2015 | Zhou | H04W 48/00 |
| | | | 370/236 |
| 2015/0373639 A1* | 12/2015 | Zhou | H04W 48/16 |
| | | | 370/311 |
| 2016/0134356 A1* | 5/2016 | Rappaport | H04B 7/15 |
| | | | 370/315 |
| 2016/0249238 A1* | 8/2016 | Hasesaka | H04W 24/02 |
| 2016/0295521 A1* | 10/2016 | Grayson | H04W 68/02 |
| 2016/0302110 A1* | 10/2016 | Baboescu | H04W 76/12 |
| 2017/0164260 A1* | 6/2017 | Shi | H04W 36/0061 |
| 2017/0199267 A1* | 7/2017 | Bitra | G01S 5/0252 |
| 2017/0215085 A1* | 7/2017 | Udeshi | H04W 16/18 |
| 2017/0311278 A1 | 10/2017 | Adjakple et al. | |
| 2017/0332292 A1* | 11/2017 | Ponnuswamy | H04W 72/085 |
| 2017/0365908 A1* | 12/2017 | Hughes | H01Q 1/12 |
| 2018/0098370 A1* | 4/2018 | Bangolae | H04W 76/14 |
| 2018/0288702 A1* | 10/2018 | Kang | H04L 43/0882 |
| 2019/0132043 A1* | 5/2019 | Wan | H04B 17/318 |
| 2019/0208502 A1* | 7/2019 | Du | H04B 7/155 |
| 2019/0268788 A1* | 8/2019 | Henry | H04W 36/24 |
| 2020/0136758 A1* | 4/2020 | Wang | H04W 74/04 |
| 2020/0137586 A1* | 4/2020 | Mukherjee | H04L 5/0048 |

OTHER PUBLICATIONS

Xuan Zhong et al: "The Development and eStadium Testbeds for Research and Development of Wireless Services for Large-scale Sports Venues", Testbeds and Research Infrastructures for the Development of Networks and Communities, 2006. Tridentcom 2006. 2nd International Conference on Barcelona, Spain March 1-3, 2006, Piscataway, NJ, USA, IEEE, Piscataway, NO, USA, Mar. 1, 2006 (Mar. 1, 2006), pp. 340-348, XP010924325, DOI: 10.1109/.

* cited by examiner

HYBRID RELAY FOR HIGH DENSITY VENUES

TECHNICAL FIELD

The present disclosure relates generally to wireless access points.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP normally connects directly to a wired Ethernet connection and the AP then provides wireless connections using radio frequency links for other devices to utilize that wired connection. Most APs support the connection of multiple wireless devices to one wired connection. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

A hybrid relay for high density venues may be provided. First, a user density value at an Access Point (AP) disposed above a ground level may be determined. Then a user density value at an AP-relay disposed at the ground level may be determined. Next, it may be determined that a difference between the user density value at the AP and the user density value at the AP-relay is greater than a predetermined threshold. The AP-relay may then be switched from a sensor mode to an AP-relay mode in response to determining that the difference between the user density value at the AP and the user density value at the AP-relay is greater than the predetermined threshold.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

People my congregate in venues comprising, but not limited to, stadiums, concert halls, convention halls, or any place where many people may densely congregate. Venues may initially be empty, but may become dense with people (i.e., human bodies) as more and more people arrive. In these venues dense with people, a Radio Frequency (RF) environment may degrade asymmetrically toward an Access Point (AP). At ground level, however, the human bodies may act as RF absorption sinks, and RF signals may not travel far horizontally through the crowd. This is the reason why APs are on the ceiling, with directional antennas pointing downward.

In this environment, signals from user devices on the ground level (e.g., smartphones) may be detected by the AP above because human bodies may be between devices at ground level, not above the user devices. The result is that, from each user device's perspective at ground level, the channel utilization may be low, and the channel may be clear most of the time. This is because the user device may only detect a few other user devices at close range horizontally. From the AP's perspective, the channel utilization may be high and the channel may barely be usable because the AP detects all the user devices that reach the AP vertically. This phenomenon may be referred to as "quiet ground and noisy ceiling". In this situation, there may be a need to reduce the load of the AP by pushing client devices to other APs. However, the client devices tend to associate to an AP above because its signal may be the loudest.

Accordingly, consistent with embodiments of the disclosure, a hybrid relay process that uses sensors (i.e., AP-relays) for high density venues may be provided. As will be described in greater detail below, based on the RF environment and user policies, the sensor may be triggered into the role of AP-relay to serve clients, thus improving capacity and channel utilization at the AP.

Figure 1:
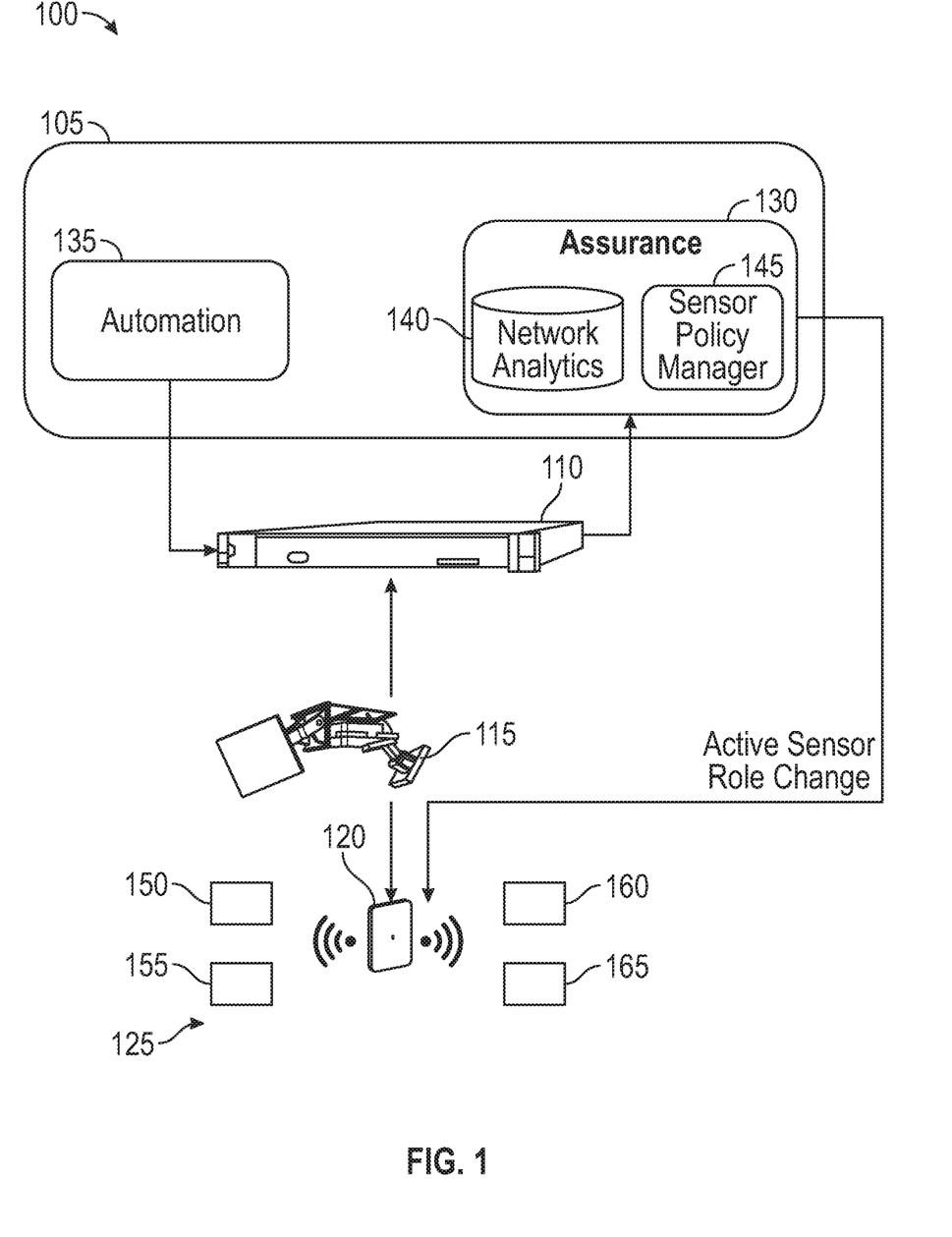
FIG. 1 is a block diagram of an operating environment.

FIG. 1 shows an operating environment 100. As shown in FIG. 1, operating environment 100 may comprise a network controller 105, a Wireless Local Area Network (WLAN) controller 110, an Access Point (AP) 115, an AP-relay 120, and a plurality of client devices 125. Network controller 105 may comprise an assurance component 130 and an automation component 135. Assurance component 130 may comprise a network analytics component 140 and a sensor policy manager component 145. Plurality of client devices 125 may comprise a first client device 150, a second client device 155, a third client device 160, and a fourth client device 165. WLAN controller 110 may control a WLAN of which AP 115 and AP-relay 120 are a part of.

Network controller 105 may provision and configure the WLAN devices by proactively monitoring, troubleshooting, and optimizing the WLAN. Full automation capabilities for provisioning and change management may be enhanced with intelligent analytics that pull telemetry data from locations in the WLAN. Radio Resource Management (RRM) processes may be performed by network controller 105 to provide real-time RF management of operating environment 100. RRM processes may allow network controller 105 to continually monitor AP 115 and AP-relay 120, for example, for the following: channel utilization, client count, signal strength between AP-relay 120 and other AP-relays, traffic load, interference, noise, coverage, and other information such as the number of nearby APs. Using this information, RRM processes on controller 105 may periodically reconfigure AP 115 and AP-relay 120 in operating environment 100 to improve efficiency by providing radio resource monitoring, AP-relay mode, transmit power control, dynamic channel assignment, and coverage hole detection and correction.

AP-relay 120 may operate in a sensor mode or in an AP-relay mode. In the sensor mode, AP-relay 120 may behave, for example, as an 802.11 a/b/g/n/ac/ax compliant (e.g., Wave 2) sensor with internal antennas and an Ethernet backhaul that may also be capable of joining AP 115 as a client. In addition to running network tests like, Internet Protocol (IP) addressing, host reachability, Remote Authentication Dial-In User Service (RADIUS), and Email/Web/File Transfer Protocol (FTP) applications, AP-relay 120 in the sensor mode may also report the user device level view (e.g., ground level) to the RRM process running in operating environment 100. In the AP-relay mode, AP-relay 120 may operate one of its two radios an AP serving the same Service Set Identifier (SSID) as AP 115 on another channel than AP 115, while the other radio stays in client mode, connected to AP 115. As will be described in greater detail below, AP-relay 120 may be switched from the sensor mode to the AP-relay mode to enhance the RRM processes.

First client device 150, second client device 155, third client device 160, or fourth client device 165 may comprise, but is not limited to, a smart phone, a personal computer, a tablet device, a mobile device, a cable modem, a cellular base station, a telephone, a remote control device, a set-top box, a digital video recorder, an Internet-of-Things (IoT) device, a network computer, a mainframe, a router, or other similar microcomputer-based device. AP 115 and AP-relay 120 may be compatible with specification standards such as the 802.11 a/b/g/n/ac/ax specification standards for example.

Embodiments of the disclosure may leverage AP-relays (e.g., AP-relay 120) that may be deployed in aforementioned high-density environments (i.e., venues dense with people). These AP-relays may be hybrid devices that may be intended to test the network as clients or serve as APs. For example, AP-relay 120 may be initially configured by network controller 105 as a client to AP 115, and may exchange with AP 115 performance metrics. These performance metrics may be collected and stored in network analytics component 140. The performance metrics may comprise, for example, channel utilization, count of frames (e.g., to and from client devices) with "retry" bit set, and count of frames for which acknowledgement was not detected. When sensor policy manager component 145 analyzes the performance metrics and determines channel utilization increased from AP 115's or AP-relay 120's viewpoint, sensor policy manager component 145 may signal automation component 135 to direct WLAN controller 110 to cause AP-relay 120 to switch to the AP-relay mode. In the AP-relay mode, a first one of AP-relay 120's two radios may be switched to the AP mode in which it serves the same SSID as AP 115 on another channel, while a second one of AP-relay 120's two radios stays in client mode, connected to AP 115.

The elements described above of operating environment 100 (e.g., network controller 105, WLAN controller 110, AP 115, AP-relay 120, and plurality of client devices 125) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 6, the elements of operating environment 100 may be practiced in a computing device 600.

Figure 2:
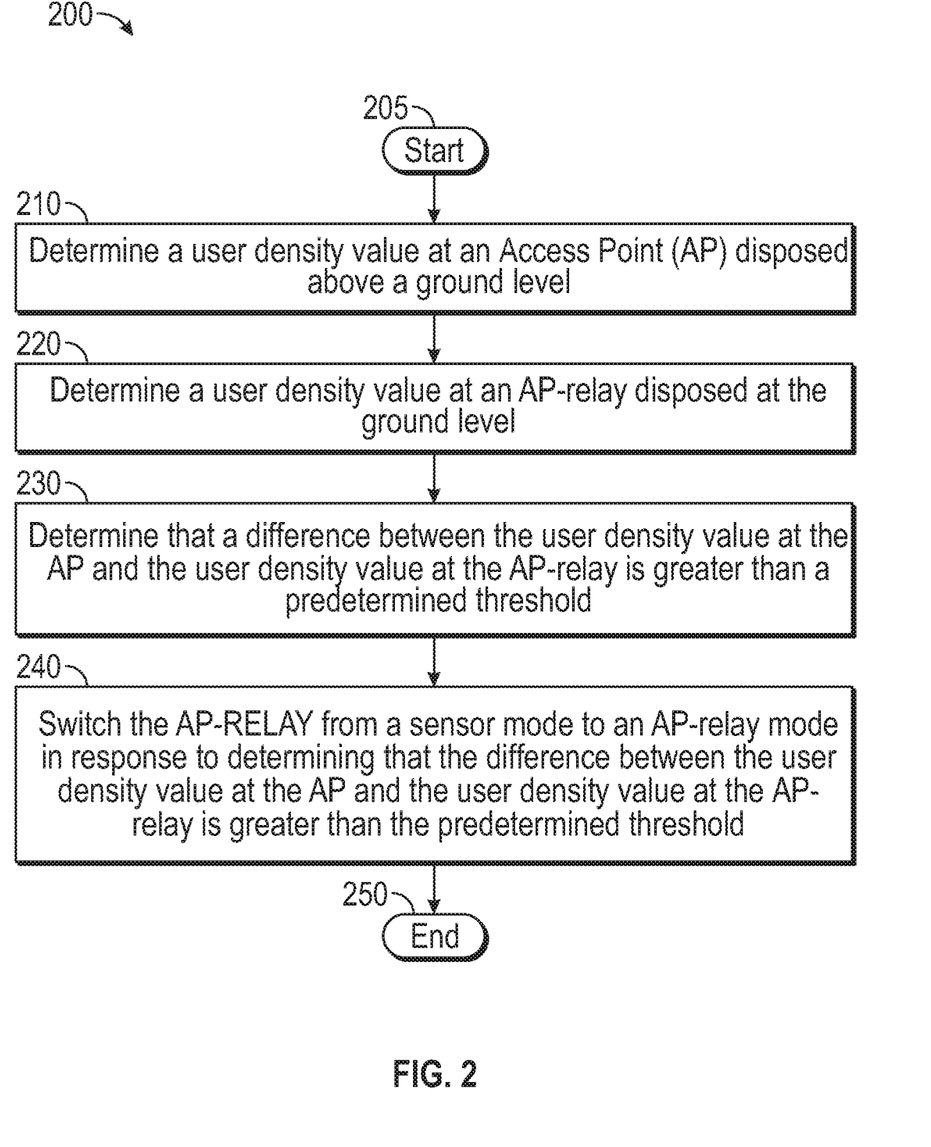
FIG. 2 is a flow chart of a method for providing a hybrid relay for high density venues.

FIG. 2 is a flow chart setting forth the general stages involved in a method 200 consistent with an embodiment of the disclosure for providing a hybrid relay for high density venues. Method 200 may be implemented using network controller 105, WLAN controller 110, AP 115, or AP-relay 120, any of which may be embodied by a computing device 600 as described in more detail below with respect to FIG. 6. Accordingly, method 200 may be described with respect to computing device 600. Ways to implement the stages of method 200 will be described in greater detail below.

Figure 3:
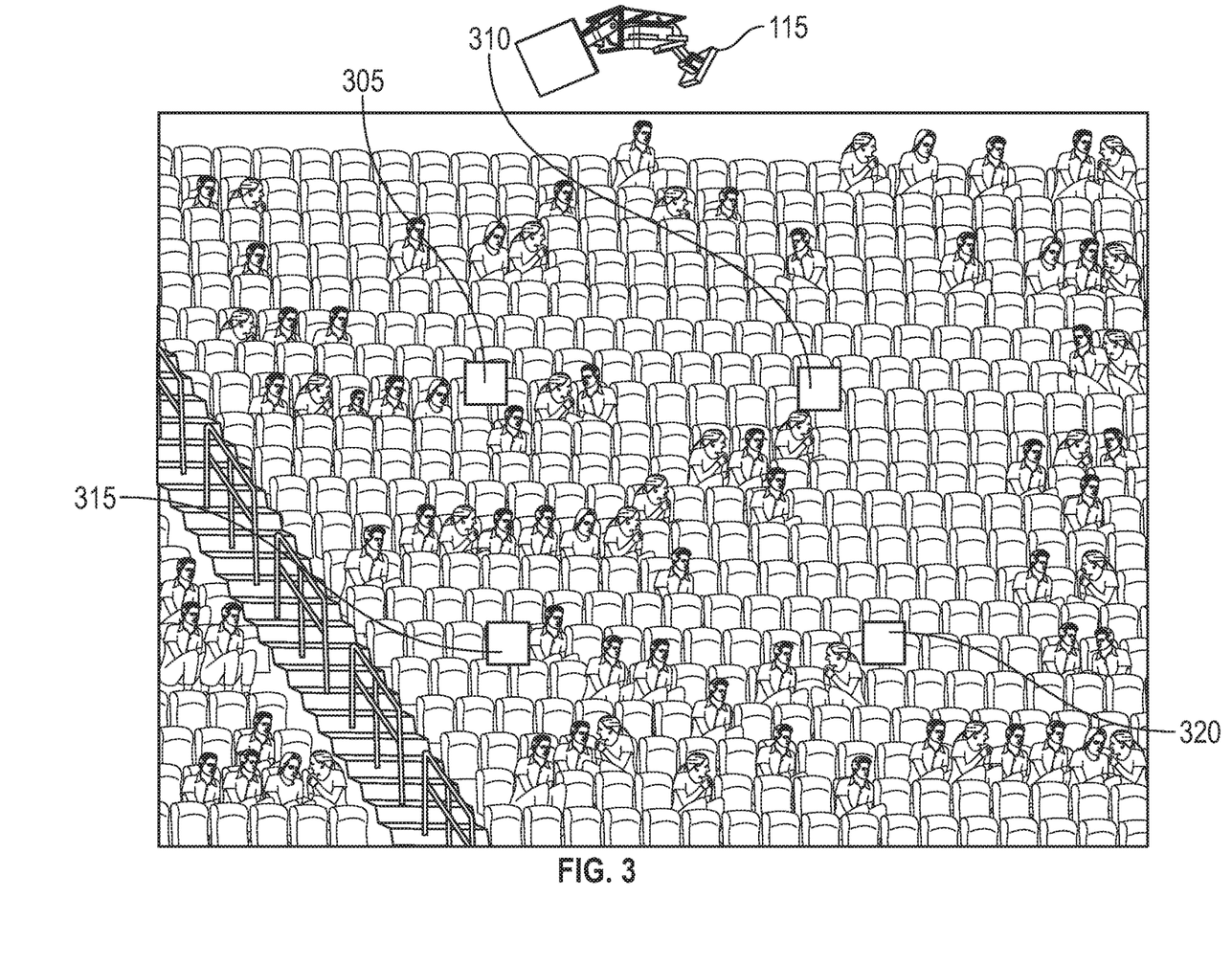
FIG. 3 illustrates Access Point (AP) and AP-relay placement in a venue.

Method 200 may begin at starting block 205 and proceed to stage 210 where computing device 600 may determine a user density value at AP 115 disposed above aground level. For example, as shown in FIG. 3, AP 115 with a directional antenna may be disposed above ground level at the venue. A plurality of AP-relays (e.g., a first AP-relay 305, a second AP-relay 310, a third AP-relay 315, and a fourth AP relay 320) may be placed below the seats at the venue. AP-relay 120 may comprise one of the plurality of AP-relays.

A centralized management system (e.g., network controller 105) may trigger AP-relay 120's mode based on AP 115's reported co-channel contention and overall load. The trigger framework, may work as follows. Initially (i.e., empty venue) network controller 105 may set each AP-relay into the sensor mode. The trigger for detection of "empty venue" may comprise low or no client device count on AP 115, which may be the closest to AP-relay 120 (i.e., highest Received Signal Strength Indicator (RSSI)).

As people (e.g., client device users) enter the venue, AP-relay 120 may forward to AP 115 (i.e., the nearest AP), the Media Access Control (MAC) address of each detected client device along with its RSSI value (from AP-relay 120's viewpoint). As user density increases at the venue, the channel utilization on AP 115 also increases. AP 115 may provide network controller 105 performance metrics that may allow network controller 105 to determine the user density value at AP 115 at a given time. These performance metrics may comprise, but are not limited to, channel utilization on AP 115 and client device count on AP 115.

From stage 210, where computing device 600 determines the user density value at AP 115 disposed above the ground level, method 200 may advance to stage 220 where computing device 600 may determine a user density value at AP-relay 120 disposed at the ground level. For example, as user density increases at the venue, AP-relay 120 may provide network controller 105 performance metrics that may allow network controller 105 to determine the user density value at AP-relay 120 at a given time. These performance metrics may comprise, but are not limited to, MAC address count reported by AP-relay 120 and RSSI values between AP-relay 120 and other AP-relays, which may be indicative of crowd density between AP-relay locations.

Once computing device 600 determines the user density value at AP-relay 120 disposed at the ground level in stage 220, method 200 may continue to stage 230 where computing device 600 may determine that a difference between the user density value at AP 115 and the user density value at AP-relay 120 is greater than a predetermined threshold. For example, with the venue dense with people, the RF environment may degrade asymmetrically toward AP 115. At ground level, however, the human bodies may act as RF absorption sinks, and RF signals may not travel far horizontally through the crowd. In this environment, signals from user devices on the ground level may be detected by the AP 115 above because human bodies may be between the user devices at ground level. The result is that, from AP-relay 120's perspective at ground level and each user device's perspective at ground level, the channel utilization may be low, and the channel may be clear most of the time even though the actually density of users around AP-relay 120 may be high. This is because AP-relay 120 may only detect a few user devices at close range horizontally due to the human bodies acting as RF absorption sinks. From AP 115's perspective, however, the channel utilization may be high and the channel may barely be usable because AP 155 may detect all the user devices that reach AP 115 vertically. Network controller 105 may monitor the difference between the detected user density value at AP 115 and the detected user density value at AP-relay 120 and determined that it is greater than a predetermined threshold. In other words, the delta between the detected user density value at AP 115 and the detected user density value at AP-relay 120 grows as the venue fills with people.

After computing device 600 determines that the difference between the user density value at AP 115 and the user density value at AP-relay 120 is greater than the predetermined threshold in stage 230, method 200 may proceed to stage 240 where computing device 600 may switch AP-relay 120 from the sensor mode to the AP-relay mode in response to determining that the difference between the user density value at AP 115 and the user density value at AP-relay 120 is greater than the predetermined threshold. For example, AP 115 may progressively switch some AP-relays (e.g., AP-relay 120) from the sensor mode to the AP-relay mode.

Figure 4:
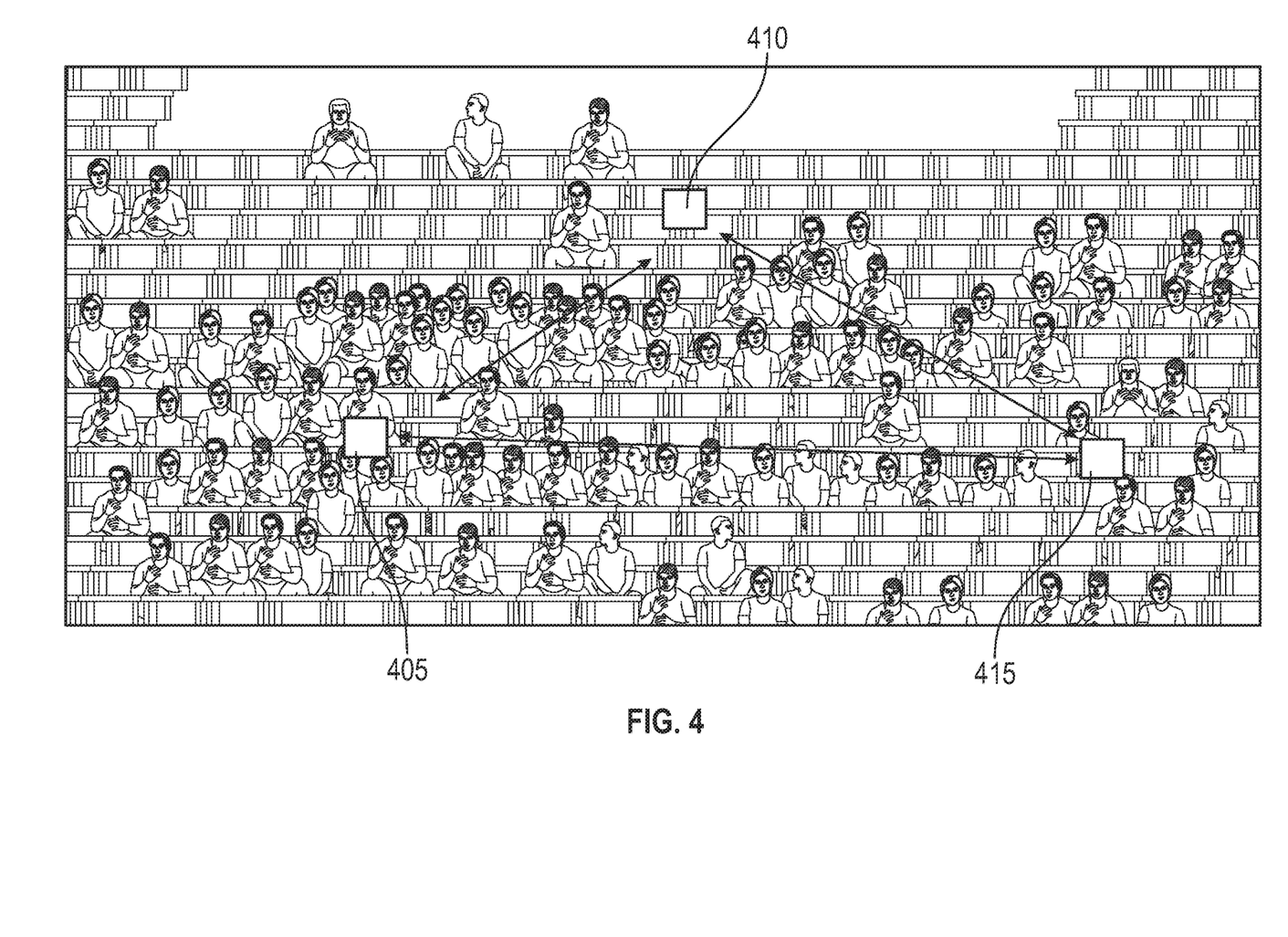
FIG. 4 illustrates user device density.

FIG. 4 illustrates actual user device density. As shown in FIG. 4, AP-relay 405 may have the greatest user density around it, AP-relay 410 may have the least user density around it, and the user density around AP-relay 415 may be somewhere between. AP-relay 120, for example, may comprise AP-relay 405 or AP-relay 415. Because the human bodies around AP-relay 405 and AP-relay 415 may act as RF absorption sinks, the channel utilization may be low from AP-relay 405's and AP-relay 415's perspective at ground level, and the channel may be clear most of the time. Accordingly, AP-relay 405 and AP-relay 415 may report low user density values causing a delta between their user density values and that reported by AP 115 to be greater than the predetermined threshold. Consequently, network controller 105 may cause AP-relay 405 and AP-relay 415 to switch from the sensor mode to the AP-relay mode.

Network controller 105, for example, may cause AP 115 to sends an instruction to each target AP-relay (e.g., AP-relay 405 and AP-relay 415) to switch to AP-relay mode. The AP-relay mode may use a first radio in infrastructure mode (e.g., acting as an AP) with the same SSID as AP 115, and a second radio as a client mode (e.g., connect to AP 115). In some embodiments, the AP-relays may report to AP 115 (over its Over-the-Air (OTA) secure connection) each individual MAC address for the client devices, and AP 115 may forward to the AP-relays the credentials for target client devices that may need to be moved to the AP-relays.

AP 115 may then send a Base Service Set Transition Management (BTM) request to the clients closest (highest RSSI) to AP-relay 120, instructing them to move to AP-relay 120's BSSID. AP-relay 120 may connect to AP 115 on a channel different from one that AP 115 uses to connect directly to client devices. AP-relay 120 may now serve as an AP to these close-by clients.

Figure 5:
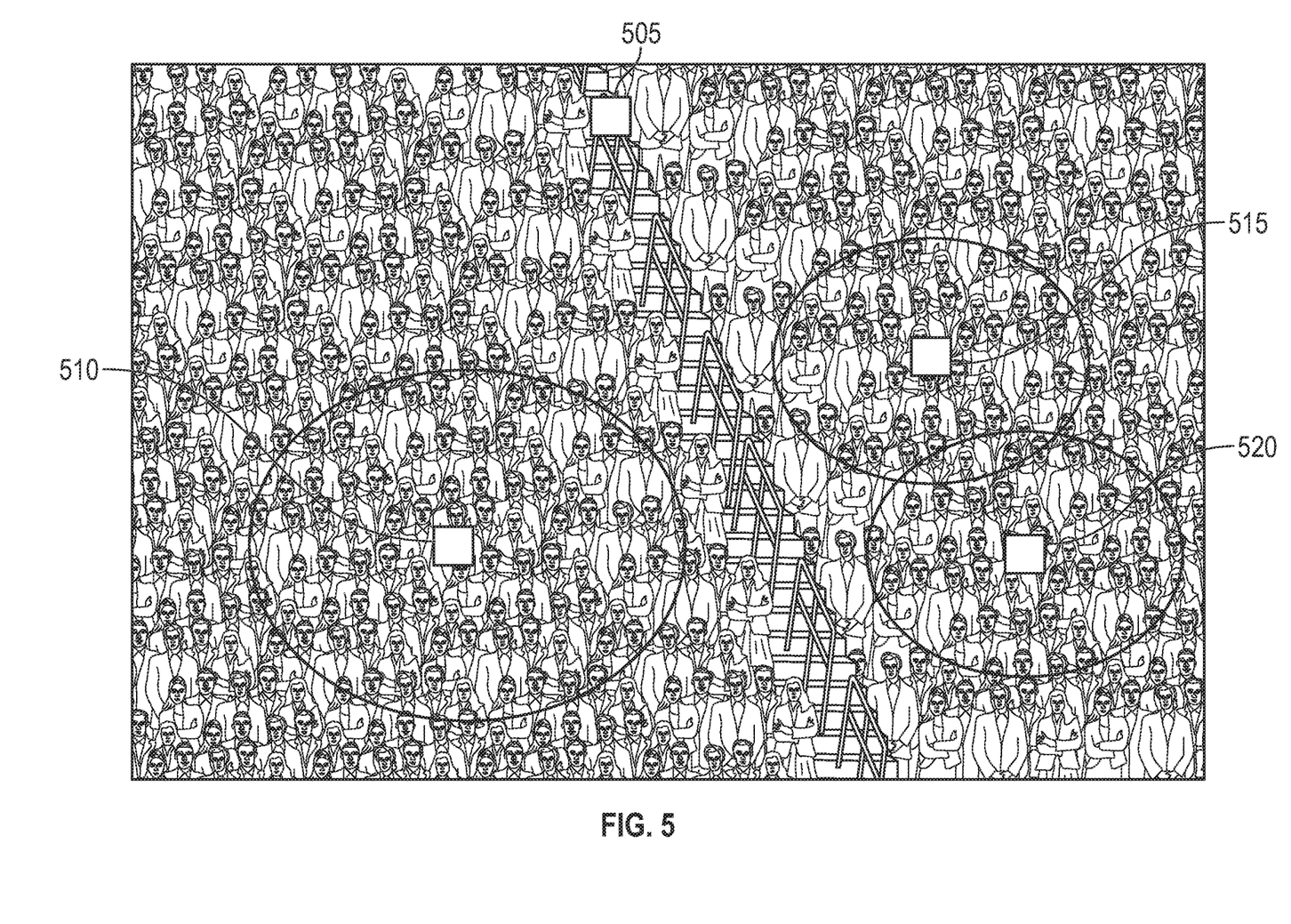
FIG. 5 illustrates AP-relays operating at different Transmit (Tx) power levels.

As shown in FIG. 5, consistent with embodiments of the disclosure, AP-relays may operate at a different transmit (Tx) power level according to the number and the range of client devices that it now serves in the horizontal direction. AP-relay 505 may operate in the sensor mode. AP-relay 510 may operate in the AP-relay mode at a power level 2. AP-relay 515 and AP-relay 520 may operate in the AP-relay mode at a power level 4. The power level and the range may be instantiated by a relay-sub-function of the RRM, based on the AP-relay to AP-relay signal, and also based on each AP-relay client count, and the overall observed or projected gain of moving more clients to each AP-relay. Because traffic may be substantially horizontal, range may be short and collisions may be minimal.

Network controller 105 may set the AP-relay AP-side channel to optimize coverage while minimizing potential co-channel interference between AP-relays along with AP-relay Tx power level. The AP-relay may use, for example, its second radio in 802.11ax Orthogonal Frequency-Division Multiple Access (OFDMA) mode to forward the client devices traffic to and from AP 115. Several AP-relays may connect to the same AP 115. AP 115 may allocate Resource Units (RUs) to each AP-relay in range based on their client device load. As AP 115 and the AP-relay operate in 802.11ax OFDMA mode and are not mobile, Multi-User, Multiple-Input, Multiple-Output (MU-MIMO) may be used for Uplink (UL) and Downlink (DL) throughput optimization. In parallel, as horizontal traffic may be hybrid (i.e., some client devices may be 802.11ax, others may not, and only some 802.11ax client devices may be able to leverage OFDMA or MU-MIMO), vertical bandwidth capability may be much larger than the requirements for the horizontal bandwidth. As the channel utilization on the AP to AP-relay decreases, AP-relays may be progressively returned to the sensor mode, thus allowing the system to scale and maintain endpoint connection performances even at traffic peaks.

Accordingly, a hybrid relay process that uses AP-relays for high density venues may be provided. Based on the RF environment and user policies, AP-relay 120 may be triggered from a sensor mode to an AP-relay mode in which it takes on the role of an AP to serve clients, thus improving capacity and channel utilization at AP 115.

Once computing device 600 switches AP-relay 120 from the sensor mode to the AP-relay mode in response to determining that the difference between the user density value at AP 115 and the user density value at AP-relay 120 is greater than the predetermined threshold in stage 240, method 200 may then end at stage 250.

Figure 6:
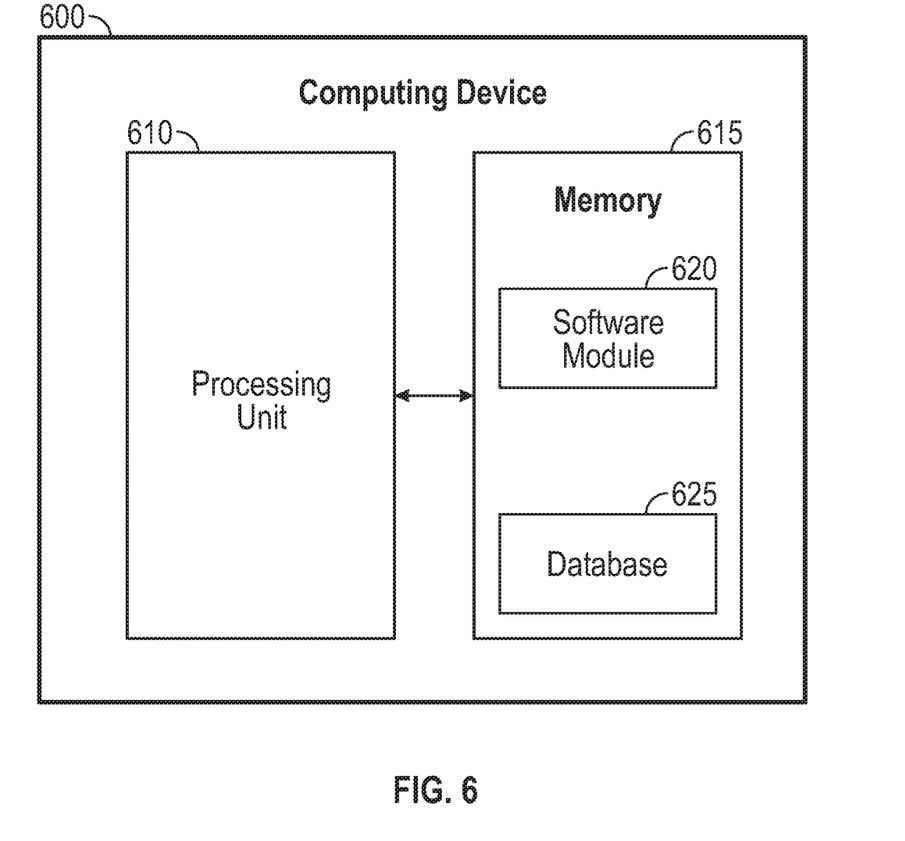
FIG. 6 is a block diagram of a computing device.

FIG. 6 shows computing device 600. As shown in FIG. 6, computing device 600 may include a processing unit 610 and a memory unit 615. Memory unit 615 may include a software module 620 and a database 625. While executing on processing unit 610, software module 620 may perform, for example, processes for providing a hybrid relay for high density venues as described above with respect to FIG. 2. Computing device 600, for example, may provide an operating environment for network controller 105, WLAN controller 110, AP 115, AP-relay 120, or plurality of client devices 125. Network controller 105, WLAN controller 110, AP 115, AP-relay 120, and plurality of client devices 125 may operate in other environments and are not limited to computing device 600.

Computing device 600 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 600 may comprise any computer operating environment, such as hand-held devices, multiprocessor systems, microprocessor-based or programmable sender electronic devices, minicomputers, mainframe computers, and the like. Computing device 600 may also be practiced in distributed computing environments where tasks are performed by remote processing devices. The aforementioned systems and devices are examples and computing device 600 may comprise other systems or devices.

Embodiments of the disclosure may comprise a method for providing a hybrid relay for high density venues. The method may comprise determining, by a computing device, a user density value at an Access Point (AP) disposed above a ground level; determining a user density value at an AP-relay disposed at the ground level; determining that a difference between the user density value at the AP and the user density value at the AP-relay is greater than a predetermined threshold; and switching the AP-relay from a sensor mode to an AP-relay mode in response to determining that the difference between the user density value at the AP and the user density value at the AP-relay is greater than the predetermined threshold.

Determining the user density value at the AP may comprise determining the user density value at the AP based on channel utilization on the AP. Determining the user density value at the AP may comprise determining the user density value at the AP based on client device count on the AP. Determining the user density value at the AP-relay may comprise determining the user density value at the AP-relay based on the number of user devices detected by the AP-relay. Determining the user density value at the AP-relay may comprise determining the user density value at the AP-relay based on a signal strength detected between the AP-relay and another AP-relay.

Switching the AP-relay from the sensor mode to the AP-relay mode may comprise causing the AP-relay to use a first radio in the AP-relay to communicate with user devices and to use a second radio in the AP-relay to communicate with the AP.

The method may further comprise causing the AP-relay to operate at different transmit power levels according to the number and the range of client devices that the AP-relay serves in a horizontal direction.

Embodiments of the disclosure may comprise a system for providing a hybrid relay for high density venues. The system may comprise a memory storage and a processing unit disposed in an Access Point (AP), the processing unit coupled to the memory storage, wherein the processing unit is operative to: determine a user density value at an Access Point (AP) disposed above a ground level; determine a user density value at an AP-relay disposed at the ground level; determine that a difference between the user density value at the AP and the user density value at the AP-relay is greater than a predetermined threshold; and switch the AP-relay from a sensor mode to an AP-relay mode in response to determining that the difference between the user density value at the AP and the user density value at the AP-relay is greater than the predetermined threshold.

The processing unit may be operative to determine the user density value at the AP based on channel utilization on the AP. The processing unit may be operative to determine the user density value at the AP based client device count on the AP. The processing unit may be operative to determine the user density value at the AP-relay based on the number of user devices detected by the AP-relay. The processing unit may be operative to determine the user density value at the AP-relay based on a signal strength detected between the AP-relay and another AP-relay.

The processing unit may be operative to cause the AP-relay to use a first radio in the AP-relay to communicate with user devices and to use a second radio in the AP-relay to communicate with the AP. The processing unit may be further operative to cause the AP-relay to operate at different transmit power levels according to the number and the range of client devices that the AP-relay serves in a horizontal direction.

Embodiments of the disclosure may comprise a computer-readable medium that stores a set of instructions which when executed perform a method comprising: determining a user density value at an Access Point (AP) disposed above a ground level; determining a user density value at an AP-relay disposed at the ground level; determining that a difference between the user density value at the AP and the user density value at the AP-relay is greater than a predetermined threshold; and switching the AP-relay from a sensor mode to an AP-relay mode in response to determining that the difference between the user density value at the AP and the user density value at the AP-relay is greater than the predetermined threshold.

Determining the user density value at the AP may comprise determining the user density value at the AP based on channel utilization on the AP. Determining the user density value at the AP may comprise determining the user density value at the AP based client device count on the AP. Determining the user density value at the AP-relay may comprise determining the user density value at the AP-relay based on the number of user devices detected by the AP-relay. Determining the user density value at the AP-relay may comprise determining the user density value at the AP-relay based on a signal strength detected between the AP-relay and another AP-relay.

Switching the AP-relay from the sensor mode to the AP-relay mode may comprise causing the AP-relay to use a first radio in the AP-relay to communicate with user devices and to use a second radio in the AP-relay to communicate with the AP.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the elements illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 600 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
    determining, by a computing device, a user density value at an Access Point (AP) disposed above a ground level;
    determining a user density value at an AP-relay disposed at the ground level;
    determining that a difference between the user density value at the AP and the user density value at the AP-relay is greater than a predetermined threshold; and
    switching the AP-relay from a sensor mode to an AP-relay mode in response to determining that the difference between the user density value at the AP and the user density value at the AP-relay is greater than the predetermined threshold, wherein switching the AP-relay from the sensor mode to the AP-relay mode comprises causing the AP-relay to use a first radio in the AP-relay to communicate with user devices and to use a second radio in the AP-relay to communicate with the AP.

2. The method of claim 1, wherein determining the user density value at the AP comprises determining the user density value at the AP based on channel utilization on the AP.

3. The method of claim 1, wherein determining the user density value at the AP comprises determining the user density value at the AP based on client device count on the AP.

4. The method of claim 1, wherein determining the user density value at the AP-relay comprises determining the user density value at the AP-relay based on a number of user devices detected by the AP-relay.

5. The method of claim 1, wherein determining the user density value at the AP-relay comprises determining the user density value at the AP-relay based on a signal strength detected between the AP-relay and another AP-relay.

6. The method of claim 1, further comprising causing the AP-relay to operate at different transmit power levels according to the number and the range of client devices that a AP-relay serves in a horizontal direction.

7. A system comprising:
    a memory storage; and a processing unit disposed in an Access Point (AP), the processing unit coupled to the memory storage, wherein the processing unit is operative to:
  determine a user density value at an Access Point (AP) disposed above a ground level;
  determine a user density value at an AP-relay disposed at the ground level;
  determine that a difference between the user density value at the AP and the user density value at the AP-relay is greater than a predetermined threshold; and
  switch the AP-relay from a sensor mode to an AP-relay mode in response to determining that the difference between the user density value at the AP and the user density value at the AP-relay is greater than the predetermined threshold, wherein the processing unit being operative to switch the AP-relay from the sensor mode to the AP-relay mode comprises the processing unit being operative to cause the AP-relay to use a first radio in the AP-relay to communicate with user devices and to use a second radio in the AP-relay to communicate with the AP.

8. The system of claim 7, wherein the processing unit being operative to determine the user density value at the AP comprises the processing unit being operative to determine the user density value at the AP based on channel utilization on the AP.

9. The system of claim 7, wherein the processing unit being operative to determine the user density value at the AP comprises the processing unit being operative to determine the user density value at the AP based client device count on the AP.

10. The system of claim 7, wherein the processing unit being operative to determine the user density value at the AP-relay comprises the processing unit being operative to determine the user density value at the AP-relay based on a number of user devices detected by the AP-relay.

11. The system of claim 7, wherein the processing unit being operative to determine the user density value at the AP-relay comprises the processing unit being operative to determine the user density value at the AP-relay based on a signal strength detected between the AP-relay and another AP-relay.

12. The system of claim 7, wherein the processing unit is further operative to cause the AP-relay to operate at different transmit power levels according to a number and the range of client devices that the AP-relay serves in a horizontal direction.

13. The system of claim 7, wherein, in the sensor mode, the AP-relay is connected to the AP as a client device, and wherein the AP allocates resource units to the AP-relay based on the user density value at the AP-relay.

14. A non-transitory computer-readable medium that stores a set of instructions which when executed perform a method comprising:
  determining a user density value at an Access Point (AP) disposed above a ground level;
  determining a user density value at an AP-relay disposed at the ground level;
  determining that a difference between the user density value at the AP and the user density value at the AP-relay is greater than a predetermined threshold; and
  switching the AP-relay from a sensor mode to an AP-relay mode in response to determining that the difference between the user density value at the AP and the user density value at the AP-relay is greater than the predetermined threshold, wherein switching the AP-relay from the sensor mode to the AP-relay mode comprises causing the AP-relay to use a first radio in the AP-relay to communicate with user devices and to use a second radio in the AP-relay to communicate with the AP.

15. The non-transitory computer-readable medium of claim 14, wherein determining the user density value at the AP comprises determining the user density value at the AP based on channel utilization on the AP.

16. The non-transitory computer-readable medium of claim 14, wherein determining the user density value at the AP comprises determining the user density value at the AP based client device count on the AP.

17. The non-transitory computer-readable medium of claim 14, wherein determining the user density value at the AP-relay comprises determining the user density value at the AP-relay based on a number of user devices detected by the AP-relay.

18. The non-transitory computer-readable medium of claim 14, wherein determining the user density value at the AP-relay comprises determining the user density value at the AP-relay based on a signal strength detected between the AP-relay and another AP-relay.

19. The non-transitory computer readable medium of claim 14, further comprising causing the AP-relay to operate at different transmit power levels according to the number and the range of client devices that a AP-relay serves in a horizontal direction.

20. The non-transitory computer readable medium of claim 14, wherein in the sensor mode, the AP-relay is connected to the AP as a client device, and wherein the AP allocates resource units to the AP-relay based on the user density value at the AP-relay.

* * * * *